(12) United States Patent
Steinmetz et al.

(10) Patent No.: US 11,053,462 B2
(45) Date of Patent: Jul. 6, 2021

(54) CLEANING COMPOSITION

(71) Applicant: BASF COATINGS GMBH, Münster (DE)

(72) Inventors: Bernhard Steinmetz, Muenster (DE); Peggy Jankowski, Wuerzburg (DE); Nadia Luhmann, Wuerzburg (DE); Michael Matura, Wuerzburg (DE)

(73) Assignee: BASF COATINGS GMBH, Münster (DE)

( * ) Notice: Subject to any disclaimer, the term of this patent is extended or adjusted under 35 U.S.C. 154(b) by 130 days.

(21) Appl. No.: 16/084,622

(22) PCT Filed: Mar. 3, 2017

(86) PCT No.: PCT/EP2017/054996
§ 371 (c)(1),
(2) Date: Sep. 13, 2018

(87) PCT Pub. No.: WO2017/157694
PCT Pub. Date: Sep. 21, 2017

(65) Prior Publication Data
US 2019/0071622 A1    Mar. 7, 2019

(30) Foreign Application Priority Data

Mar. 14, 2016 (EP) .................................. 16160080

(51) Int. Cl.
| | | |
|---|---|---|
| *C11D 7/24* | (2006.01) | |
| *C11D 7/26* | (2006.01) | |
| *C11D 7/50* | (2006.01) | |
| *C11D 11/00* | (2006.01) | |
| *C09D 9/00* | (2006.01) | |
| *C11D 7/34* | (2006.01) | |

(52) U.S. Cl.
CPC ............ *C11D 7/5009* (2013.01); *C09D 9/005* (2013.01); *C11D 7/241* (2013.01); *C11D 7/242* (2013.01); *C11D 7/244* (2013.01); *C11D 7/247* (2013.01); *C11D 7/261* (2013.01); *C11D 7/262* (2013.01); *C11D 7/268* (2013.01); *C11D 7/34* (2013.01); *C11D 7/509* (2013.01); *C11D 7/5022* (2013.01); *C11D 7/5027* (2013.01); *C11D 11/0041* (2013.01)

(58) Field of Classification Search
CPC ......... C11D 7/241; C11D 7/242; C11D 7/247; C11D 7/268; C11D 7/261; C11D 7/262; C11D 7/509; C11D 7/5022; C11D 7/5027; C11D 7/34

USPC ....... 510/169, 183, 184, 185, 188, 189, 234, 510/245, 493, 505, 506
See application file for complete search history.

(56) References Cited

U.S. PATENT DOCUMENTS

| | | | |
|---|---|---|---|
| 2,694,658 A | 11/1954 | Crepeau et al. | |
| 5,346,640 A * | 9/1994 | Leys ..................... | C09D 9/005 134/38 |
| 5,612,303 A * | 3/1997 | Takayanagi ............. | A61K 8/37 510/174 |
| 5,789,359 A * | 8/1998 | Shimozawa ......... | C11D 7/5004 510/175 |
| 6,291,417 B1 * | 9/2001 | Flynn ..................... | C07C 43/12 510/412 |
| 9,085,751 B2 * | 7/2015 | Hori ................... | B23K 35/3612 |
| 2003/0228997 A1 * | 12/2003 | Doyel ................. | C11D 7/5018 510/410 |
| 2004/0138077 A1 * | 7/2004 | Pageau .................. | C09D 9/005 510/201 |
| 2005/0064004 A1 * | 3/2005 | Schnabel ............... | A01N 25/02 424/405 |
| 2008/0139437 A1 * | 6/2008 | Power .................... | C09D 9/005 510/208 |
| 2012/0046212 A1 * | 2/2012 | Bourdette ............... | C09D 9/04 510/206 |
| 2014/0147395 A1 | 5/2014 | Rieth et al. | |

FOREIGN PATENT DOCUMENTS

| | | |
|---|---|---|
| CN | 101242914 A | 8/2008 |
| DE | 19526351 A1 | 1/1997 |
| DE | 102011000083 A1 | 7/2012 |
| JP | 2008075090 A | 4/2008 |

OTHER PUBLICATIONS

International Search Report for International Patent Application No. PCT/EP2017/054996, dated Apr. 26, 2017, 2 pages.
European Search Report for EP Patent Application No. 16160080.4, dated Sep. 15, 2016, 3 pages.

* cited by examiner

*Primary Examiner* — Gregory R Delcotto
(74) *Attorney, Agent, or Firm* — Armstrong Teasdale LLP

(57) ABSTRACT

Provided herein is a cleaning composition including: from 20 to 90% by weight of dimethyl sulfoxide, from 5 to 30% by weight of at least one mineral oil (M), and from 5 to 50% by weight of at least one bipolar organic solvent (L). The ranges of proportions indicated are in each case based on the total weight of the cleaning composition. Also provided herein is a method of cleaning components by employing the cleaning composition, and also the cleaned components themselves.

10 Claims, No Drawings

CLEANING COMPOSITION

CROSS-REFERENCE TO RELATED APPLICATIONS

This application is the national stage entry of PCT/EP2017/054996, filed Mar. 3, 2017, which claims the benefit of priority to European Patent Application No. 16160080.4, filed Mar. 14, 2016, which are incorporated by reference in their entirety herein.

FIELD OF THE INVENTION

The present invention relates to a novel cleaning composition which is outstandingly suitable for cleaning a variety of plant systems in industrial use and parts of such plants. In particular, the cleaning composition is suitable for cleaning pipes in production facilities for surface coatings, for example surface coatings for vehicle coating.

BACKGROUND

In the field of industrial vehicle coating, for example mass-production automobile coating, plants having complex piping systems are used in order to convey the appropriate surface coatings to the application location. Mention may be made by way of example to the ring line plants which are known per se.

Two factors in particular have to be taken into account for cleaning these plants, and these make this procedure particularly challenging. Firstly, important parts of the piping facilities are accessible only with difficulty but have a large surface area on which fouling can deposit or become fixed. Secondly, complex surface coating formulations have a particular tendency to produce very stubborn fouling which can be removed only with difficulty. Thus, various organic constituents, in particular physically curable binders and a variety of additive components such as highly hydrophobic silicone derivatives, and inorganic components, in particular pigments and fillers, can result in formation of particularly intensive encrustations and deposits. Process-related contamination in the pipes, for example highly hydrophobic lubricants, also make cleaning of the plants very challenging.

Various cleaning components and compositions are known in industrial applications, but these cannot always satisfactorily solve the abovementioned problems in cleaning and/or contain significant proportions of components which are damaging to health and the environment. Thus, dimethyl sulfoxide (DMSO) which is known in principle for cleaning is not able to remove any type of contamination in a satisfactory way. NMP (1-methyl-2-pyrrolidone) which is likewise very effective in principle for cleaning is, as is known, classified as a toxic and teratogenic component.

DESCRIPTION

It was therefore an object of the present invention to provide a possibility by means of which the abovementioned fouling can be eliminated particularly well and in which the use of components which are particularly hazardous to health and the environment can at the same time be dispensed with.

The abovementioned object has been able to be achieved by a novel cleaning composition comprising
from 20 to 90% by weight of dimethyl sulfoxide,
from 5 to 30% by weight of at least one mineral oil (M), and
from 5 to 50% by weight of at least one bipolar organic solvent (L),
where the ranges of proportions indicated are in each case based on the total weight of the cleaning composition.

The novel cleaning composition is provided by the present invention and will hereinafter also be referred to as cleaning composition of the invention. Preferred embodiments of the cleaning composition of the invention can be derived from the following description and the dependent claims.

The present invention also provides a method of cleaning articles, components and/or plants and also parts of such plants, in which the cleaning composition of the invention is employed.

It has been found that excellent cleaning of a variety of articles, components and/or plants and also parts of such plants can be achieved by means of the cleaning composition or its use in a cleaning method. Surprisingly, the cleaning action of the composition is significantly better than that of the individual components. For this reason, the composition and the method are particularly useful in the field of cleaning of plants having complex piping systems, for example ring line plants in the field of the vehicle industry.

The cleaning composition of the invention contains dimethyl sulfoxide. The in-principle possibility of using dimethyl sulfoxide as cleaner is known. However, this component displays an excellent cleaning action only in combination with the components described below.

The proportion of dimethyl sulfoxide is, based on the total amount of the cleaning composition, from 20 to 90% by weight. Preferred range of the proportion is from 35 to 80% by weight, more preferably from 50 to 70% by weight.

The cleaning composition of the invention additionally contains at least one mineral oil (M).

For the purposes of the present invention, the mineral oils known per se to those skilled in the art can be used. These are, as is known, oils which are obtained by distillation of fossil raw materials such as petroleum and whose main constituents are paraffinic hydrocarbons (saturated acyclic hydrocarbons), naphthenic hydrocarbons (saturated cyclic hydrocarbons) and/or aromatic hydrocarbons. In general, these distillates additionally contain small amounts of various sulfur- and/or nitrogen-containing organic compounds and also olefinic hydrocarbons. In contrast to mineral greases and mineral waxes, mineral oils are fluid and not wax-like or solid under standard conditions (1013 hPa, 20° C.). They contain correspondingly higher proportions of rather short-chain hydrocarbons. Preferred mineral oils have a viscosity of not more than 1000 mPas, more preferably not more than 500 mPas and particularly preferably not more than 100 mPas, at 25° C. (ASTM D 445).

For the purposes of the present invention, paraffinic and/or naphthenic mineral oils are preferably used because of the health-damaging and environmentally damaging character of aromatic mineral oils.

For the purposes of the present invention, use is very preferably made of isoparaffin-based mineral oils, i.e. paraffinic mineral oils in which the majority of the hydrocarbons have an acyclic, branched structure.

Mineral oils of this type are commercially available in numerous forms, for example from ExxonMobil Chemical.

The particularly preferred isoparaffin-based mineral oils are obtainable, for example, under the trade name Isopar.

Very particularly preferred cleaning compositions contain, based on the total amount of the cleaning composition, not more than 10% by weight, preferably not more than 5% by weight, of aromatic mineral oils, more preferably no aromatic mineral oils.

The proportion of the at least one mineral oil is, based on the total amount of the cleaning composition, from 5 to 30% by weight. A preferred range of the proportion is from 10 to 20% by weight.

The cleaning composition of the invention additionally contains at least one bipolar organic solvent (L) (different from dimethyl sulfoxide).

Bipolar organic solvents are also known to those skilled in the art. These are organic solvents which, owing to both hydrophilic components and hydrophobic components, can serve as solubilizers between aqueous phases and hydrophobic phases of a mixture.

Typical hydrophilic components are, in accordance with the knowledge of a person skilled in the art, functional polar groups such as hydroxyl, amino and carboxyl groups or polar segments such as ethylene oxide units. Typical hydrophobic units are, likewise in accordance with specialist knowledge, hydrocarbon groups such as alkyl groups.

Suitable bipolar solvents are, for example, (i) monoalcohols having from 4 to 14 carbon atoms, preferably aliphatic monoalcohols having from 4 to 14 carbon atoms, (ii) glycol ethers of (preferably aliphatic) monoalcohols having from 4 to 14 carbon atoms, preferably monoethylene glycol ethers or oligoethylene glycol ethers (from 2 to 5, preferably from 2 to 3, ethylene oxide units) of monoalcohols having from 4 to 14 carbon atoms, with the glycol unit being able to have a free hydroxyl group or the hydroxyl group being able to be alkoxylated, preferably methoxylated and/or ethoxylated, and (iii) esters of (preferably aliphatic) monoalcohols having from 4 to 14 carbon atoms, in particular esters of formic or acetic acid.

Preferred bipolar solvents are those from the abovementioned groups (i) and (ii).

The at least one bipolar organic solvent (L) preferably does not have any ionic and/or potentially ionic groups such as carboxyl and/or amino groups.

As preferred solvents (L), explicit mention may be made of: 2-ethylhexanol, butyl glycol, butyl diglycol, n-butanol, n-hexanol, isobutanol, n-pentanol, isopentanol, isotridecyl alcohol and hexyl glycol.

Very particular preference is given to using 2-ethylhexanol.

The proportion of the at least one bipolar organic solvent is, based on the total amount of the cleaning composition, from 5 to 50% by weight. A preferred range of the proportion is from 10 to 40% by weight, particularly preferably from 15 to 35% by weight.

The cleaning composition of the invention very particularly preferably consists to an extent of at least 80% by weight, preferably at least 90% by weight, more preferably 100% by weight, of dimethyl sulfoxide, at least one mineral oil and at least one bipolar organic solvent. Accordingly, the cleaning composition of the invention contains further constituents such as further organic solvents only in minor amounts, if at all.

The present invention likewise provides a method of cleaning components, in the present case articles, components and/or plants and parts of such plants, in which the cleaning composition of the invention is employed.

All above-described particular and preferred embodiments of the cleaning composition of the invention of course also apply to the method of the invention.

The use of the cleaning composition can be carried out in a wide variety of ways. The component to be cleaned can, for example, be left to stand in the composition for a particular period of time and/or be sprayed and/or flushed with the composition. As an alternative or in addition, it is possible to clean the component to be cleaned with additional use of cleaning equipment such as brushes or cloths.

The components to be cleaned or the surfaces to be cleaned of the components to be cleaned are preferably metallic in nature.

Last but not least, the invention provides a component, in the present case an article, component, a plant or a part of such a plant, which has been cleaned by the method of the invention.

EXAMPLES

To determine the cleaning quality of various cleaning compositions and components, the following method was selected.

Steel sheets having dimensions of 30×60 cm and coated with a cured standard electrophoretic coating from BASF Coatings GmbH served as substrate. A spot having a diameter of about 5 cm of a blue standard water-based coating (WBC) from BASF Coatings GmbH and a spot having a diameter of about 5 cm of a 0.01% strength solution of silicone oil AK 1.000 from Wacker in butyl glycol were in each case applied thereto at a spacing of about 30 cm. The steel sheet was subsequently dried at a temperature of 40° C. for a period of 10 minutes.

The steel sheets which had been treated in this way with various cleaning compositions and components as per table 1 were subsequently treated using a cloth soaked with the cleaning compositions and components for wiping off the spots. Here, the cloth was wiped only twice over the corresponding spot.

The resulting steel sheets were subsequently dried and evaluated in respect of remaining blue coloration at the position of the spot of the blue water-based coating. Remaining blue coloration indicated an unsatisfactory cleaning action of the cleaning compositions and components in respect of the water-based coating and its constituents.

The steel sheet was then dried at a temperature of 80° C. for a period of 30 minutes, allowed to cool to room temperature and subsequently coated with a conventional two-component clear coating in a target layer thickness (dry film layer thickness) of 30 microns in the region of the spot of the 0.01% strength solution of silicone oil Wacker AK 1.000 in butyl glycol. The steel sheet was then flashed off at room temperature for 20 minutes and subsequently baked at a temperature of 140° C. for a period of 20 minutes. The clear coating obtained was subsequently assessed in respect of wetting defects. Here, wetting defects indicate that the cleaning action of the cleaning compositions and components in respect of the silicone oil is unsatisfactory.

Table 1 shows the cleaning compositions and components together with the results obtained according to this procedure.

TABLE 1

Various cleaning compositions and components and the corresponding results of the cleaning tests

| Composition | Blue color of the cleaned spot present | Assessment of the cleaning power in respect of standard WBC | Wetting defects present | Assessment in respect of silicone oil |
|---|---|---|---|---|
| 100% NMP | No | OK | Yes | Not OK |
| 100% DMSO | No | OK | Yes | Not OK |
| 100% Isopar L | Yes | Not OK | No | OK |
| 100% Isopar V | Yes | Not OK | No | OK |
| 100% 2-ethylhexanol | Yes | Not OK | Yes | Not OK |
| 60% of DMSO 25% of 2-ethyl-hexanol 10% of Isopar L 5% of Isopar V | No | OK | No | OK |
| 45% of DMSO 30% of 2-ethyl-hexanol 20% of Isopar L 5% of Isopar V | No | OK | No | OK |
| 70% of DMSO 20% of 2-ethyl-hexanol 10% of Isopar L | No | OK | No | OK |

The examples show that the cleaning compositions of the invention are outstandingly suitable for cleaning. They are even better than the NMP which is alternatively used but is damaging to health and the environment. Advantages can also be identified compared to the use of DMSO and mineral oils. A composition which gives excellent cleaning results but in which components which are particularly damaging to health and the environment can at the same time be dispensed with is therefore provided.

The invention claimed is:

1. A cleaning composition comprising:
   from 45 to 70% by weight of dimethyl sulfoxide;
   from 10 to 25% by weight of at least one mineral oil (M); and
   from 20 to 30% by weight of 2-ethylhexanol,
   wherein the ranges of proportions indicated are in each case based on the total weight of the cleaning composition.

2. The cleaning composition as claimed in claim 1 comprising at least one paraffinic and/or naphthenic mineral oil (M).

3. The cleaning composition as claimed in claim 2 comprising at least one isoparaffin-based mineral oil (M).

4. The cleaning composition as claimed in claim 1 comprising, based on the total amount of the cleaning composition, not more than 5% by weight of aromatic mineral oils.

5. The cleaning composition as claimed in claim 1 comprising at least 80% by weight of dimethyl sulfoxide, at least one mineral oil, and 2-ethylhexanol.

6. A method of cleaning components comprising articles, components, and/or industrial plants and parts of such industrial plants, wherein a cleaning composition as claimed in claim 1 is contacted with said components.

7. The cleaning composition as claimed in claim 4, wherein the cleaning composition comprises, based on the total amount of the cleaning composition, no aromatic mineral oils.

8. The cleaning composition as claimed in claim 5 comprising at least 90% by weight of dimethyl sulfoxide, at least one mineral oil, and 2-ethylhexanol.

9. A cleaning composition consisting of:
   from 45 to 70% by weight of dimethyl sulfoxide;
   from 10 to 25% by weight of at least one miner oil (M); and
   from 20 to 30% by weight of at least one bipolar organic solvent (L) selected from the group consisting of aliphatic monoalcohols, wherein the ranges of proportions indicated are in each case based on the total weight of the cleaning composition.

10. A method of cleaning components comprising articles, components, and/or industrial plants and parts of such industrial plants, wherein a cleaning composition as claimed in claim 9 is contacted with said components.

* * * * *